United States Patent
Bartlett (12)

(10) Patent No.: US 6,248,035 B1
(45) Date of Patent: Jun. 19, 2001

(54) ROTARY DEVICE OF VARIABLE DIAMETER

(75) Inventor: Stephen Charles Bartlett, Bridgnorth (GB)

(73) Assignee: GKN Technology Limited (GB)

( * ) Notice: Subject to any disclaimer, the term of this patent is extended or adjusted under 35 U.S.C. 154(b) by 0 days.

(21) Appl. No.: 09/381,016

(22) PCT Filed: Mar. 13, 1998

(86) PCT No.: PCT/GB98/00625

§ 371 Date: Sep. 14, 1999

§ 102(e) Date: Sep. 14, 1999

(87) PCT Pub. No.: WO98/41785

PCT Pub. Date: Sep. 24, 1998

(30) Foreign Application Priority Data

Mar. 15, 1997 (GB) .................................... 9705418

(51) Int. Cl.⁷ .............................. F16H 63/00; F16H 7/18; F16H 7/00
(52) U.S. Cl. .................. 474/13; 474/8; 474/100; 474/85
(58) Field of Search .................... 474/8, 9, 13, 46, 474/11, 84, 85, 12, 17, 166, 167, 19, 181, 174, 100

(56) References Cited

U.S. PATENT DOCUMENTS

| 2,747,420 | * | 5/1956 | Beck | 474/85 |
| 3,981,205 | * | 9/1976 | Avramidis et al. | 474/13 |
| 4,365,963 | * | 12/1982 | Thirion De Briel | 474/13 |
| 4,624,651 | * | 11/1986 | Jaccob | 474/13 |
| 4,655,733 | * | 4/1987 | Jonason | 474/85 X |

FOREIGN PATENT DOCUMENTS

| 564392 | 2/1958 | (BE) . |
| 390 631 | 8/1965 | (CH) . |
| 0 100 971 | 2/1984 | (EP) . |
| 2.085.135 | 12/1971 | (FR) . |
| WO97/33105 | 9/1997 | (WO) . |

* cited by examiner

Primary Examiner—David A. Bucci
Assistant Examiner—Marcus Charles

(57) ABSTRACT

A rotary device comprising two elements (12, 20/22) supported for rotation about an axis (11) and movable relative to one another along said axis, and diaphragm spring means (33) urging said elements axially relative to one another, said diaphragm spring means having radially inner and outer portions connected respectively to said elements and arranged such that said elements are constrained to movement in opposite directions by the same or substantially the same distance as one another about an axially fixed position.

17 Claims, 5 Drawing Sheets

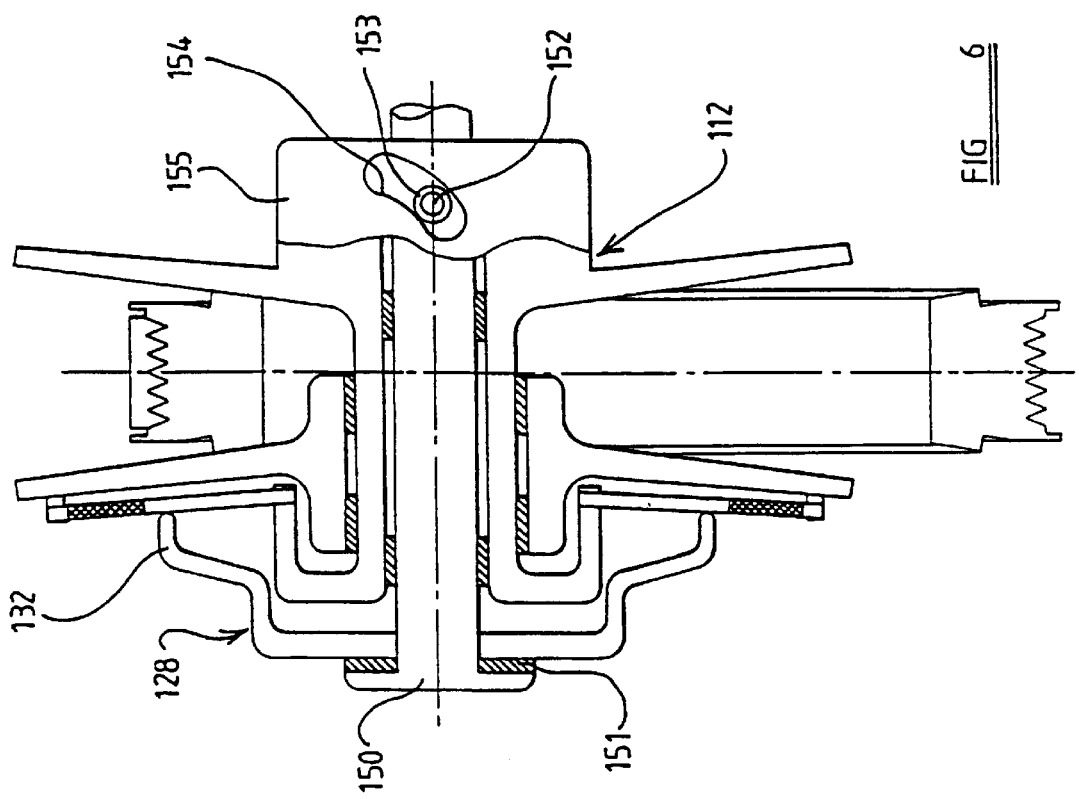
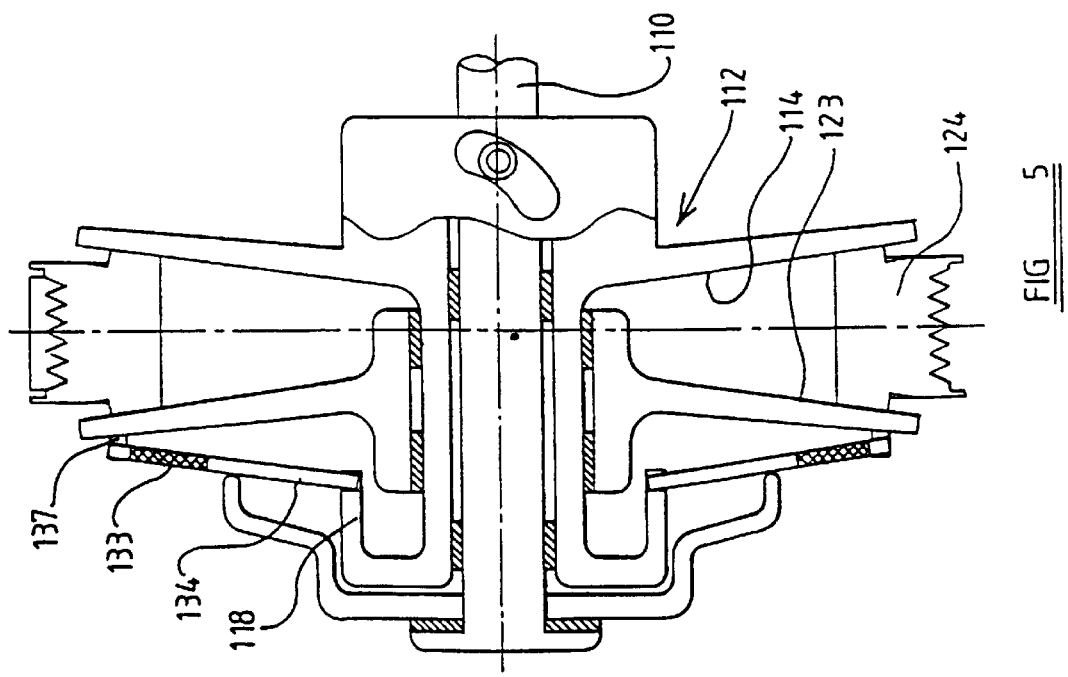

ROTARY DEVICE OF VARIABLE DIAMETER

BACKGROUND OF THE INVENTION

This invention relates to a rotary device, which preferably is a pulley for use with an endless flexible drive element such as a belt, and whose effective diameter is variable in order to achieve a variable transmission ratio between the pulley and another pulley or pulleys with which the flexible drive element cooperates.

The invention has been devised in relation to such a pulley which comprises a pair of sheave members rotatable about an axis and supported for movement relative to one another in the direction along said axis, the sheave members having generally frusto-conical driving surfaces facing one another to define a generally V-section annular groove therebetween; and a drive ring disposed between the sheave members and having an external circumferential surface engagable by the drive belt and side surfaces engaging said facing generally frusto-conical driving surfaces of the sheave members, the drive ring being constrained between the sheave members and being able to assume an eccentric position relative thereto when permitted by the dimensions of the groove defined between the sheave members in accordance with the relative axial position thereof. Such a pulley will hereafter be referred to as a pulley of the kind specified.

In a pulley of the kind specified, as the distance between the driving surfaces of the sheave members increases (i.e. the V-section groove there between becomes wider) the drive ring is able to assume an increasingly eccentric position relative to tie sheave members and is caused to do so by the tension of the belt entrained around it. It may be the tension in the belt which causes the drive ring to assume an eccentric position and increase the distance between the sheave members. As the speed at which the drive ring is driven by the sheave members is dependent on the effective diameter at which they are engaged by the drive ring, the effective diameter of the pulley is decreased.

A pulley of the kind specified may be required to be used in the auxiliary drive system of an internal combustion engine for a motor vehicle. It is usual to arrange for the auxiliaries, which may comprise one or more of the following, namely an alternator, a water pump, a cooling fan, a power steering pump, an air conditioning pump, and so on, to be driven from the engine crank shaft by a belt. If a pulley of the kind specified is provided on the engine crank shaft, a variable transmission ratio may be provided between the crank shaft and the auxiliaries, so that the latter can be driven at a reasonably high speed when the engine is running slowly and yet not be over-speeded when the engine is being operated at its maximum speed. A means for maintaining the required tension in the drive belt or for causing a speed-dependent increase in belt tension, is, of course, additionally required when a pulley of the kind specified is thus used.

When a pulley of the kind specified is in use, it is a requirement that the drive ring should remain in a constant or substantially constant axial position, to maintain its alignment with the other pulley or pulleys with which the drive belt cooperates. It is the object of the present invention to provide a pulley of the kind specified with a convenient construction which enables this requirement to be met. In fulfilling this object, however, it will be appreciated as pointed out hereafter that the present invention is applicable to devices other than a pulley of the kind specified.

BRIEF SUMMARY OF THE INVENTION

According to one aspect of the present invention, we provide a rotary device comprising two elements supported for rotation about an axis and movable relative to one another along said axis, and diaphragm spring means urging said elements axially relative to one another, said diaphragm spring means having radially inner and outer portions connected respectively to said elements and being arranged so that said relative movement between said elements comprises movement thereof in opposite directions by the same or substantially the same distance as one another.

According to another aspect of the invention, we provide a rotary device comprising two elements supported for rotation about an axis and movable relative to one another along said axis, and diaphragm spring means urging said elements axially relative to one another, said diaphragm spring, means having a torque transmitting connection with each of said elements whereby torque can be transmitted therebetween.

Preferably, both aspects of the invention are provided together, and further preferably the diaphragm spring means provides for torque transmission between said axially movable elements and a driving component such as a shaft element on which they are supported.

The diaphragm spring means preferably comprises a diaphragm spring element having an annular portion and a plurality of fingers extending radially from the annular portion and circumferentially spaced thereabout. Preferably the fingers extend radially inwardly from the annular portion of the spring element, and are connected at or adjacent their free ends to one of the two axially movable elements of the device, whilst the other of the axially movable elements of the device is connected at or adjacent the outer periphery of the annular portion of the spring element.

To ensure that the two elements of the device undergo their relative axial movement about a reference position which is axially stationary or substantially stationary, the spring element of the device requires to be supported against axial movement about a part thereof which, in use, has an unchanged axial position when the inner and outer parts of the spring element move relative to one another.

Preferably the rotary device is a pulley, and the two elements comprise sheave members with generally frusto-conical surfaces facing one another to define a generally V-section annular groove therebetween.

The pulley may be one which cooperates directly with an endless flexible drive element whose cross-sectional shape includes portions which engage the generally frusto-conical surfaces of the sheave members directly, the effective diameter of tie pulley depending on the axial distance between the sheave members so that the drive element engages the sheave members at a greater or lesser radius depending on the axial position thereof.

Preferably, however, the pulley is a pulley of the kind specified, with a drive ring disposed between the sheave members and which is engaged by the drive element.

A rotary device, such as a pulley, according to the first aspect of the invention has the advantage that the spring means constituted by a diaphragm spring element serves the two purposes of urging the axially movable elements towards one another and controlling their relative movement so that they move by the same distance as one another in opposite directions. It is not necessary to provide, in addition to the spring means, a separate mechanism for the latter purpose.

If the spring element also provides for torque transmission between the sheave members of the pulley and a driving component, yet a further relative simplification in construction and manufacture can be achieved.

In the case where the diaphragm spring element does not provide for torque transmission between the sheave members of the pulley and a driving component such as a shaft element on which they are supported, there is required to be provided an alternative torque transmission means for such purpose. Such an alternative torque transmitting means may be arranged to provide, in the normal direction of torque transmission in use, an axial force which assists the diaphragm spring means in urging said elements axially towards one another.

Such an alternative torque transmission means may comprise cam and follower means associated with the shaft element or other driving component and with one of the axially movable elements.

BRIEF DESCRIPTION OF THE DRAWINGS

The invention will now be described by way of example with reference to the accompanying drawings, of which:

FIG. 5 is a section through a further embodiment of pulley according to the invention in a first operative position;

FIG. 6 is a section through the pulley of FIG. 5 in a second operative position.

DETAILED DESCRIPTION OF THE INVENTION

Figure 1:
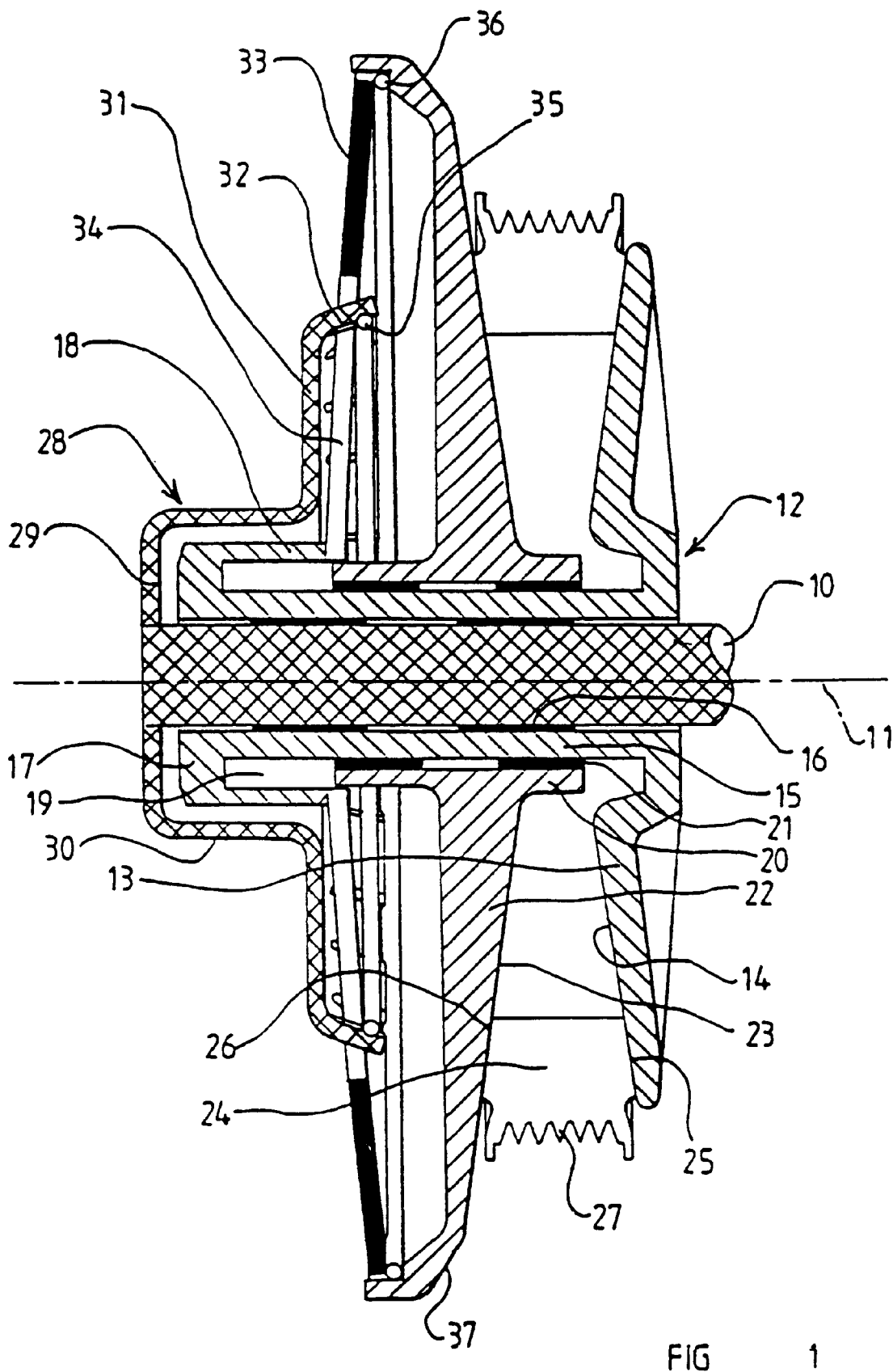
FIG. 1 is a section through a pulley according to the invention, in a first operative position.
Figure 2:
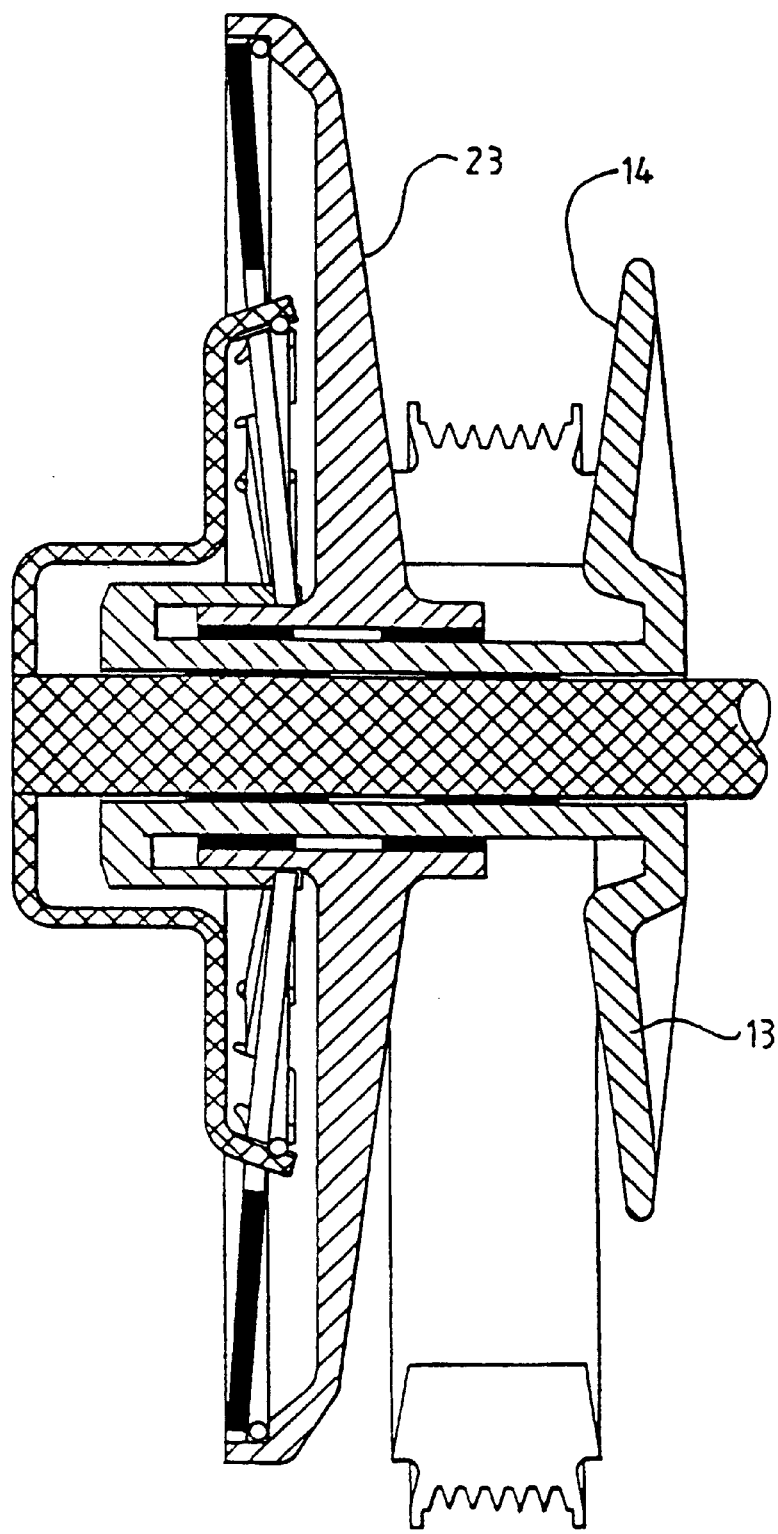
FIG. 2 is a section through the pulley of FIG. 1 in a second operative position.

Referring firstly to FIGS. 1 and 2 of the drawings, the illustrated pulley comprises a shaft 10 whose rotational axis is indicated at 11. All references to "radially" and "axially" are with reference to this axis 11. A first sheave element indicated generally at 12 comprises a portion 13 which affords a frusto-conical driving, surface 14, and a tubular portion 15 extending from the radially innermost part of the portion 13, closely surrounding the shaft 10 and being slidable axially thereon with interposed bearing bushes 16. At the end of the tubular portion 15 remote from that at which the portion 13 extends there is a radially outwardly extending portion 17 followed by a further tubular portion 18 which defines an annular gap 19 between it and the portion 15.

A second sheave member comprises a tubular portion 20 which is slidable axially on the outside of the portion 15 of the first sheave member, with interposed bearing bushes 21, and a portion 22 extending outwardly from the portion 20 and affording a frusto-conical driving surface 23 facing the driving surface 14 of the first sheave member Between the driving surfaces 14, 23 of tie two sheave members there is disposed a drive ring 24 which is somewhat wedge-shaped in cross-sectional shape having inclined side surfaces 25, 26 for cooperation respectively with the driving surfaces 14, 23 of the sheave members. The drive ring further comprises a peripheral surface 27 whose shape is adapted for cooperation with a drive belt of so-called poly-vee configuration, having a ridged surface on its face which cooperates with the drive ring.

At the end of tie shaft 10 adjacent the portion 17 of the first sheave member there is fixed a carrier member which is indicated generally at 28 and which comprises an annular portion 29 extending radially outwardly from the shaft 10 followed by a tubular portion 30, a further radially outwardly extending annular portion 31, and a number of circumferentially spaced axially extending inclined fingers 32.

A diaphragm spring element comprises an annular portion 33 from the radially innermost periphery of which extend a plurality of circumferentially spaced fingers 34. The fingers 32 of the carrier member 28 extend through the gaps between the fingers 34, and the diaphragm spring element is held captive to the carrier member 28 by a spring ring 35 engaging annular groove portions provided within the fingers 32 adjacent the free ends thereof. The radially innermost free ends of the fingers 34 engage the end of the portion 18 of the first sheave element 12, whilst the outer periphery of the annular portion 33 of the diaphragm spring element abuts an abutment ring 36 provided within an outward extension 37 of the portion 22 of the second sheave element. The diaphragm spring element has a number of circumferentially spaced outwardly extending projections at its outer periphery, engaging recesses in the extension 37 of the sheave member for torque transmission between the sheave member and the diaphragm spring. The innermost ends of the fingers 34 of the diaphragm spring engage recesses in the end of the portion 18 for torque transmission with this and thus with the sheave member 12, and the engagement of the diaphragm spring with the portion 32 provides for torque transmission between the spring and the shaft 10.

The diaphragm spring, in addition to providing for torque transmission between the two sheave members and the shaft 10, also biases the sheave members axially relative to one another so that the driving surfaces of the sheave member are urged towards one another. The V-section groove defined between the sheave members always attempts to reach its narrowest value as shown in FIG. 1 in which the drive ring runs concentrically with the sheaves. If, however, the tension in the belt engaging the drive ring is such that an axial component of force is exerted between the sheaves exceeding the force exerted by the spring urging the sheaves together, the sheave members move apart and the drive ring can run eccentrically, as shown in FIG. 2. The drive ring runs stably in such eccentric position, because of the tension in the belt entrained around it.

Figure 3A:
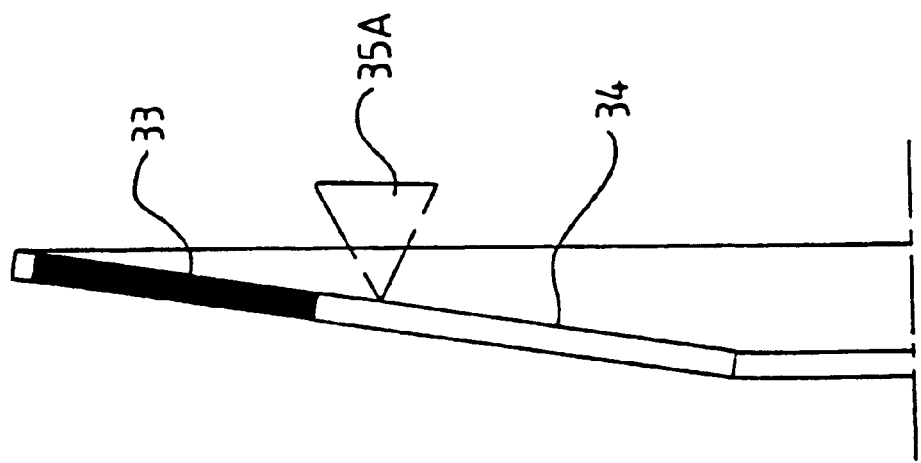
FIG. 3 illustrates the diaphragm spring element of the pulley, in different operative positions.
Figure 3B:
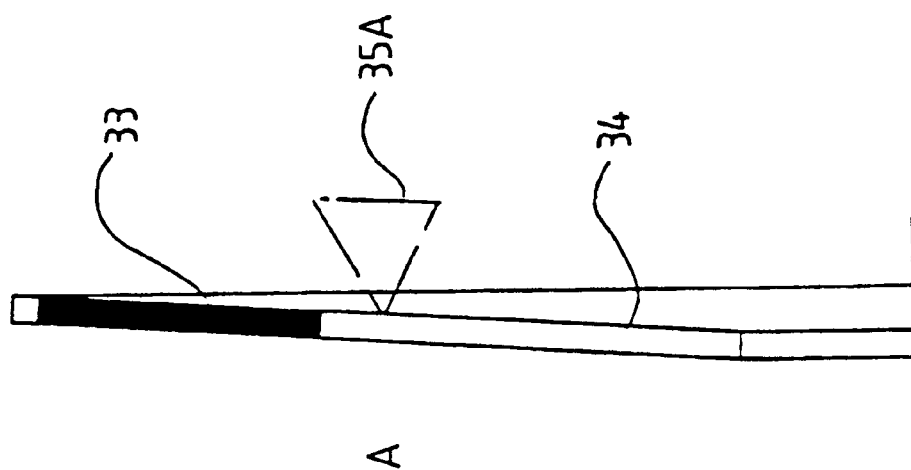
Figure 3C:
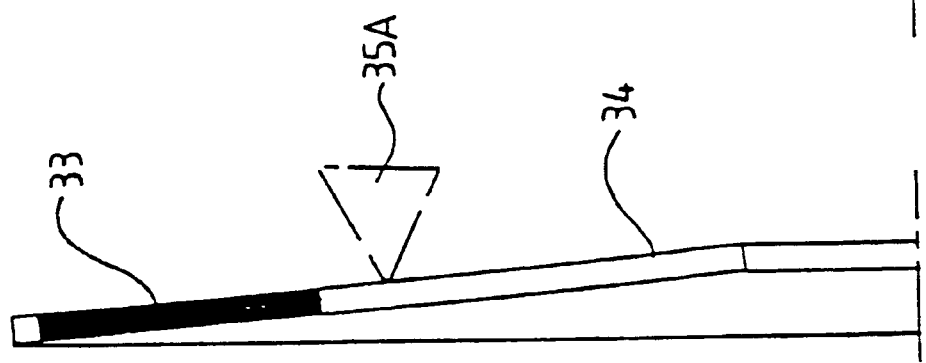

FIG. 3 of the drawings shows diagrammatically the configuration of the diaphragm spring of the pulley in various conditions. FIG. 3A shows the spring in its free state, in which the fingers 34 are each straight and in line with the annular portion 33. As installed, as shown in FIG. 1 of the drawings, the spring is of the configuration shown in FIG. 3B, in which the annular portion 33 is of slightly less dished configuration than in the free state of the spring while the fingers are each curved, under axial load. When the pulley is in the condition shown in FIG. 2, the spring is in the condition shown in FIG. 3C, in which the annular portion 33 of the spring is of a dished configuration in the opposite sense to that in its free state, whilst the fingers 34 remain curved since they are still under load. When the annular portion of the diaphragm spring changes the sense of its dished configuration as between the conditions of FIG. 3B and FIG. 3C, the axial force exerted between the innermost and outermost parts of the annular portion of the spring varies comparatively little, so the curvature of the fingers in FIG. 3C is substantially the same as that in FFIG. 3B. The support of the spring by the ring 35, as indicated by arrow 35a in FIG. 3, which is generally midway between the outer periphery of the annular portion 33 of the spring and the inner ends of the fingers 34 thereof, is such that the radially inner and outer extremities of the spring move equal distances in opposite directions relative to the support 35a of the spring. The result of this is that when the pulley changes its operative condition between that of FIG. 1 and that of FIG. 2, the drive ring 24 does not move axially relative to the shaft 10, and remains in alignment with the other pulleys with which the belt entrained around the drive ring cooperates.

Figure 4:
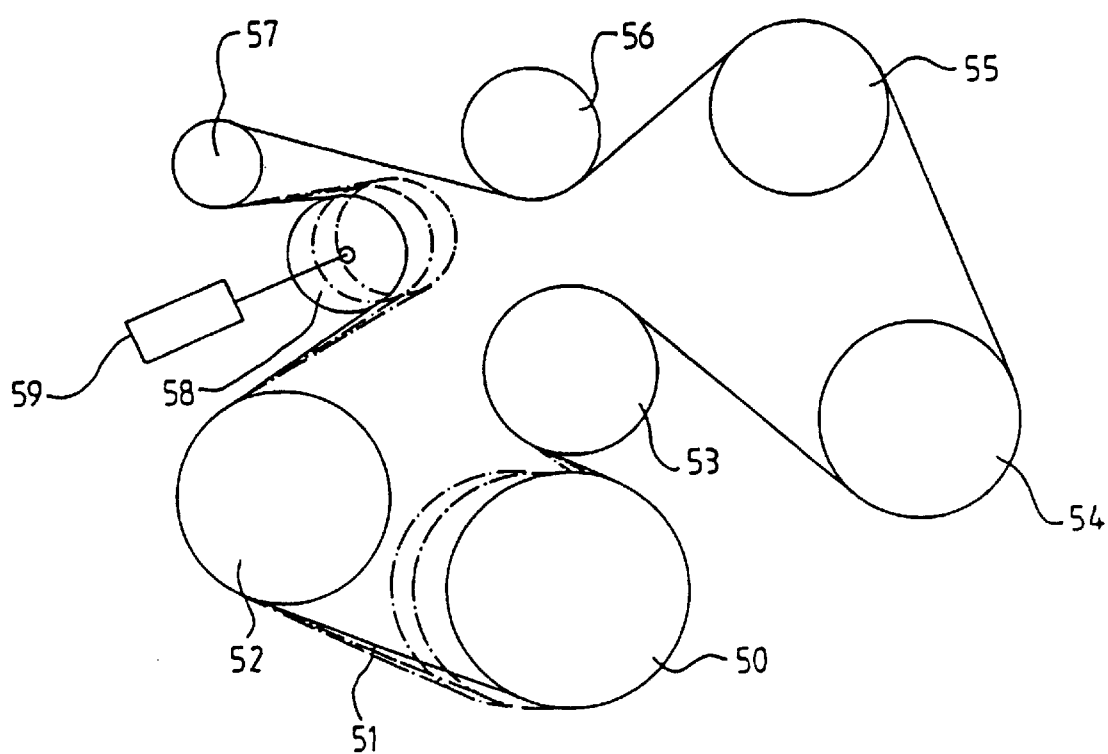
FIG. 4 shows diagrammatically how a pulley according to the invention may be incorporated in an auxiliary drive system of an internal combustion engine for a motor vehicle.

FIG. 4 of the drawings shows how the pulley as above described may be utilised in the auxiliary drive system of an internal combustion engine of a motor vehicle. In FIG. 4, the pulley of variable effective diameter is indicated at 50, with a belt 51 entrained around the drive ring of the pulley. The belt is also entrained around a number of other pulleys, in a serpentine path, which other pulleys are:

an air pump for an exhaust gas treatment device 52 water pump and fan 53 power steering pump 54 air conditioning compressor 55 idler pulley 56 alternator 57.

Belt tension is maintained by a tensioner pulley 58 controlled by an actuator 59. The actuator 59 is responsive to engine speed in such a way that when engine speed is slow the tension in the belt is slightly reduced, so that the pulley 50 assumes its condition of maximum effective diameter, thereby to drive the auxiliaries relatively quickly. When engine speed increases, the belt tension is increased so that the drive ring of the pulley 50 is caused to run eccentrically, decreasing the effective diameter of the pulley as shown in FIG. 2. Thus the auxiliaries driven by the engine are not overspeeded at high engine speeds.

A pulley as described above uses a diaphragm spring element for three purposes, namely torque transmission, spring biasing and centering of the sheave members. It would be possible for the diaphragm spring element to provide only the latter two functions, and to include some other mechanism or expedient, e.g. co-operating, splines or the mechanism described hereafter, for torque transmission between the sheave members and shaft of the pulley.

Referring now to FIGS. 5 and 6 of the drawings, these show, in operative conditions corresponding to those of FIGS. 1 and 2, a further embodiment of pulley in accordance with the invention. The majority of the components of the pulley shown in FIGS. 5 and 6 correspond in function to components previously described with reference to FIGS. 1 and 2, and accordingly these aspects of the pulley of FIGS. 5 and 6 will not hereafter be described in detail. Components corresponding, to those appearing in FIGS. 1 and 2 are identified by like reference numerals with the addition of 100.

The principal components shown in FIGS. 5 and 6 are a shaft 110 and first and second sheave elements which afford driving surfaces 114, 123 respectively. A drive ring 124 is received between tie surfaces 114, 123 of the sheave elements. There is a diaphragm spring element comprising an annular portion 133 and radially inwardly extending fingers 134, the innermost ends of which engage respective recesses in a portion 118 connected to the sheave element (112) having the surface 114. The outer periphery of the annular portion 133 of the diaphragm spring has a number of circumferentially spaced projections engaging respective recesses in a formation 137 of the sheave element having the surface 123. Thus the two sheave elements are connected to one another by the diaphragm spring element for torque transmission, in addition to having their surfaces 114, 123 urged towards one another.

The pulley further comprises a carrier member 128 with a portion 132 which is of annular form instead of comprising fingers as in the embodiment of FIGS. 1 and 2, and thus simply abuts the diaphragm spring element near the outermost ends of its fingers 134. The carrier member 128 is not rotationally fast with the shaft 110 but is held captive thereon by a head 150 on the end of the shaft with an interposed thrust bearing 151.

The diaphragm spring element provides for torque transmission between the sheave elements of the pulley and urges the sheave elements axially relative to one another. Torque transmission between the sheave elements and the A shaft 110 is provided by at least two circumferentially spaced pegs, one of which is shown at 152, extending radially outwardly from the shaft and carrying respective rollers as 153 engaging in arcuate cam slots 154 in a boss part 155 of the sheave elements 112. The orientation of the cam slot 154 is such that in the normal direction of torque transmission with the shaft the sheave element 112 is urged axially towards the other sheave element. The reaction force is carried by portion 132 of the carrier member 128. This augments tile force exerted by the diaphragm spring element urging the sheave elements towards one another, with an increasing force as the torque increases.

By relieving the diaphragm spring element of the function of transmitting torque with the shaft 110 and by having the above described "servo action", which reduces the axial force required to be exerted by the diaphragm spring alone, the size of the diaphragm spring can be reduced and durability should be improved.

It is to be appreciated that there are other ways of achieving the servo action effect provided by the roller 153 engaging cam slot 154: for example a screw-threaded engagement between a sheave element and shaft or a part connected thereto could be provided.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A rotary device comprising:

a shaft element rotatable about an axis;

two rotary elements supported by said shaft element for rotation therewith about said axis, said rotary elements being movable relative to one another along said axis; and a diaphragm spring having radially inner and outer portions connected respectively to said rotary elements;

said diaphragm spring having a torque transmitting connection with each of said rotary elements and also with said shaft element, to provide for transmission of torque between both said rotary elements and said shaft element;

said diaphragm spring further constraining said rotary elements to axial movement in opposite directions by substantially the same distance as one another relative to a position fixed lengthwise of said axis.

2. A rotary device according to claim 1 comprising a torque-transmitting means providing for torque transmission between at least one of said elements and a shaft element on which they are supported, and which also provides an an axial force which, in the normal direction of torque transmission with the shaft elements, assist the diaphragm spring in urging said rotary elements axially towards one another.

3. A rotary device according to claim 1 wherein the diaphragm spring comprises an annular portion and a plurality of fingers extending radially from said annular portion and circumferentially spaced thereabout.

4. A rotary device according claim 1 which is a pulley, and wherein said two rotary elements comprise sheave members having generally frusto-conical surfaces facing one another to define a generally V-section annular groove therebetween, said diaphragm spring urging said surfaces towards one another.

5. A rotary device according to claim 2 wherein said torque-transmitting means comprises cam and follower means associated with the shaft element and one of the rotary elements.

6. A rotary device according to claim 3 wherein said fingers extend radially inwardly from the annular portion of the diaphragm spring and are connected at or adjacent their free ends to one of the two rotary elements, whilst the other of the rotary element is connected at or adjacent the outer periphery of the annular portion to the diaphragm spring.

7. A rotary device according to claim 3 wherein said diaphragm spring is supported against axial movement at a part thereof which, in use, has an unchanged axial position when the inner and outer portions of the diaphragm spring move axially relative to one another.

8. A rotary device according to claim 3 which is a pulley, and wherein said two rotary elements comprise sheave members having generally frusto-conical surfaces facing one another to define a generally V-section annular groove therebetween, said diaphragm spring urging said surfaces towards one another.

9. The pulley according to claim 4 comprising a drive ring disposed between the sheave members and having an external circumferential surface engagable by an endless flexible drive element such as a belt, and side surfaces engaging said facing generally frusto-conical surfaces of the sheave members, said drive ring being able to assume an eccentric position relative to the sheave members when permitted by the dimensions of the groove defined between the sheave members in accordance with the relative axial position thereof.

10. A rotary device according to claim 6 wherein said diaphragm spring is supported against axial movement at a part thereof which, in use, has an unchanged axial position when the inner and outer portions of the diaphragm spring move axially relative to one another.

11. A rotary device according to claim 6 which is a pulley, and wherein said two rotary elements comprise sheave members having generally frusto-conical surfaces facing one another to define a generally V-section annular groove therebetween, said diaphragm spring urging said surfaces towards one another.

12. A rotary device according to claim 7 which is a pulley, and wherein said two rotary elements comprise sheave members having generally frusto-conical surfaces facing one another to define a generally V-section annular groove therebetween, said diaphragm spring urging said surfaces towards one another.

13. The pulley according to claim 9 comprising a drive ring disposed between the sheave members and having an external circumferential surface engagable by an endless flexible drive element such as a belt, and side surfaces engaging said facing generally frusto-conical surfaces of the sheave members, said drive ring being able to assume an eccentric position relative to the sheave members when permitted by the dimensions of the groove defined between the sheave members in accordance with the relative axial position thereof.

14. A rotary device according to claim 10 which is a pulley, and wherein said two rotary elements comprise sheave members having generally frusto-conical surfaces facing one another to define a generally V-section annular groove therebetween, said diaphragm spring urging said surfaces towards one another.

15. The pulley according to claim 11 comprising a drive ring disposed between the sheave members and having an external circumferential surface engagable by an endless flexible drive element such as a belt, and side surfaces engaging said facing generally frusto-conical surfaces of the sheave members, said drive ring being able to assume an eccentric position relative to the sheave members when permitted by the dimensions of the groove defined between the sheave members in accordance with the relative axial position thereof.

16. The pulley according to claim 12 comprising a drive ring disposed between the sheave members and having an external circumferential surface engagable by an endless flexible drive element such as a belt, and side surfaces engaging said facing generally frusto-conical surfaces of the sheave members, said drive ring being able to assume an eccentric position relative to the sheave members when permitted by the dimensions of the groove defined between the sheave members in accordance with the relative axial position thereof.

17. The pulley according to claim 14 comprising a drive ring disposed between the sheave members and having an external circumferential surface engagable by an endless flexible drive element such as a belt, and side surfaces engaging said facing generally frusto-conical surfaces of the sheave members, said drive ring being able to assume an eccentric position relative to the sheave members when permitted by the dimensions of the groove defined between the sheave members in accordance with the relative axial position thereof.

* * * * *